(12) United States Patent
Weidmann

(10) Patent No.: US 6,203,215 B1
(45) Date of Patent: *Mar. 20, 2001

(54) INTERCHANGEABLE MINIATURE-FILM MAGAZINE

(75) Inventor: Bjoern Weidmann, Braunschweig (DE)

(73) Assignee: Rollei Fototechnic GmbH, Braunschweig (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/221,591

(22) Filed: Dec. 29, 1998

(30) Foreign Application Priority Data

Dec. 31, 1997 (DE) .............................. 197 58 326

(51) Int. Cl.⁷ .............................. G03B 1/00; G03B 17/26
(52) U.S. Cl. .......................... 396/414; 396/511; 396/538
(58) Field of Search .................................... 396/360, 361, 396/411, 414, 415, 511, 512, 513, 538, 407; 352/72, 75, 78 R

(56) References Cited

U.S. PATENT DOCUMENTS

| | | | |
|---|---|---|---|
| 1,704,789 | * 3/1929 | Chamberlin | 396/412 |
| 2,911,894 | * 11/1959 | Hennig et al. | 396/541 |
| 3,387,546 | * 6/1968 | Winkler et al. | 396/415 |
| 3,463,071 | * 8/1969 | Winkler et al. | 396/415 |
| 4,114,172 | * 9/1978 | Yao | 396/355 |
| 4,158,494 | * 6/1979 | Mielke | 396/440 |
| 4,168,896 | 9/1979 | Mielke | 356/512 |
| 4,281,913 | * 8/1981 | Shono et al. | 396/446 |
| 4,342,510 | * 8/1982 | Guillaume | 396/414 |
| 4,556,301 | 12/1985 | Hartung | 352/78 R |
| 4,671,636 | * 6/1987 | Desormeaux | 396/407 |
| 4,705,375 | 11/1987 | Kirigaya et al. | 396/513 |
| 4,717,931 | * 1/1988 | Himuro et al. | 396/407 |
| 4,885,599 | * 12/1989 | Goto et al. | 396/407 |
| 5,751,402 | * 5/1998 | Nakamura et al. | 355/40 |
| 5,881,332 | * 3/1999 | Valvo | 396/511 |

FOREIGN PATENT DOCUMENTS 21 31 881   12/1972   (DE) .
23 62 862    6/1975   (DE) .

* cited by examiner

Primary Examiner—David M. Gray
(74) Attorney, Agent, or Firm—Foley & Lardner

(57) ABSTRACT

The invention relates to an interchangeable miniature-film magazine having a receiver for a film cassette, a sprocket for the film advancement, a winding drum, and a shutter for closing the film gate provided in the magazine housing. In order to provide as compact a design as possible, the sprocket can be located immediately behind the cassette outlet, at a clear distance which is smaller than the width of the film gate across. The unexposed film, which is previously wound completely onto the winding drum in the prewind operation, with the winding direction of the film on the winding drum being identical to that of the spool body of the film cassette, is guided from the winding drum, arranged closely alongside the film cassette, in a large radius around the film cassette into the plane of the film gate, with a subsequent, nearly 180°-deflection around the sprocket into the cassette outlet.

26 Claims, 2 Drawing Sheets

INTERCHANGEABLE MINIATURE-FILM MAGAZINE

BACKGROUND OF THE INVENTION

Field of the Invention

The invention relates to an interchangeable miniature-film magazine.

SUMMARY OF THE INVENTION

An object of the present invention is to develop an interchangeable miniature-film magazine in as compact a design as possible.

According to one aspect of the present invention, an interchangeable miniature-film magazine, comprises: a magazine housing and a receiver located in the housing for receiving a film cassette that houses film. The interchangeable miniature-film magazine further includes a sprocket located in the housing for advancement of the film, a winding drum that is arranged in the housing in close proximity to the film cassette to wind the film, and a shutter for closing a film gate located in the housing. The sprocket is located a first distance from an outlet of the film cassette. The first distance is smaller than a second distance which corresponds to a width of the film gate.

According to another aspect of the present invention, the interchangeable miniature-film magazine is arranged such that the film is guided within the housing along a first film path from the winding drum around an outside of the film cassette, along a second film path parallel to an image plane corresponding to the film gate, along a third film path around an outer diameter of the sprocket, and along a fourth film path from the sprocket to the outlet of the film cassette.

Further features of the invention form the subject matter of the claims and will be explained in more detail, in conjunction with further advantages of the invention, with reference to an exemplary embodiment.

BRIEF DESCRIPTION OF THE DRAWINGS

Embodiments of the invention, serving as an examples, are illustrated schematically in the drawings, in which.

DETAILED DESCRIPTION OF THE PREFERRED EMBODIMENTS

Figure 1:
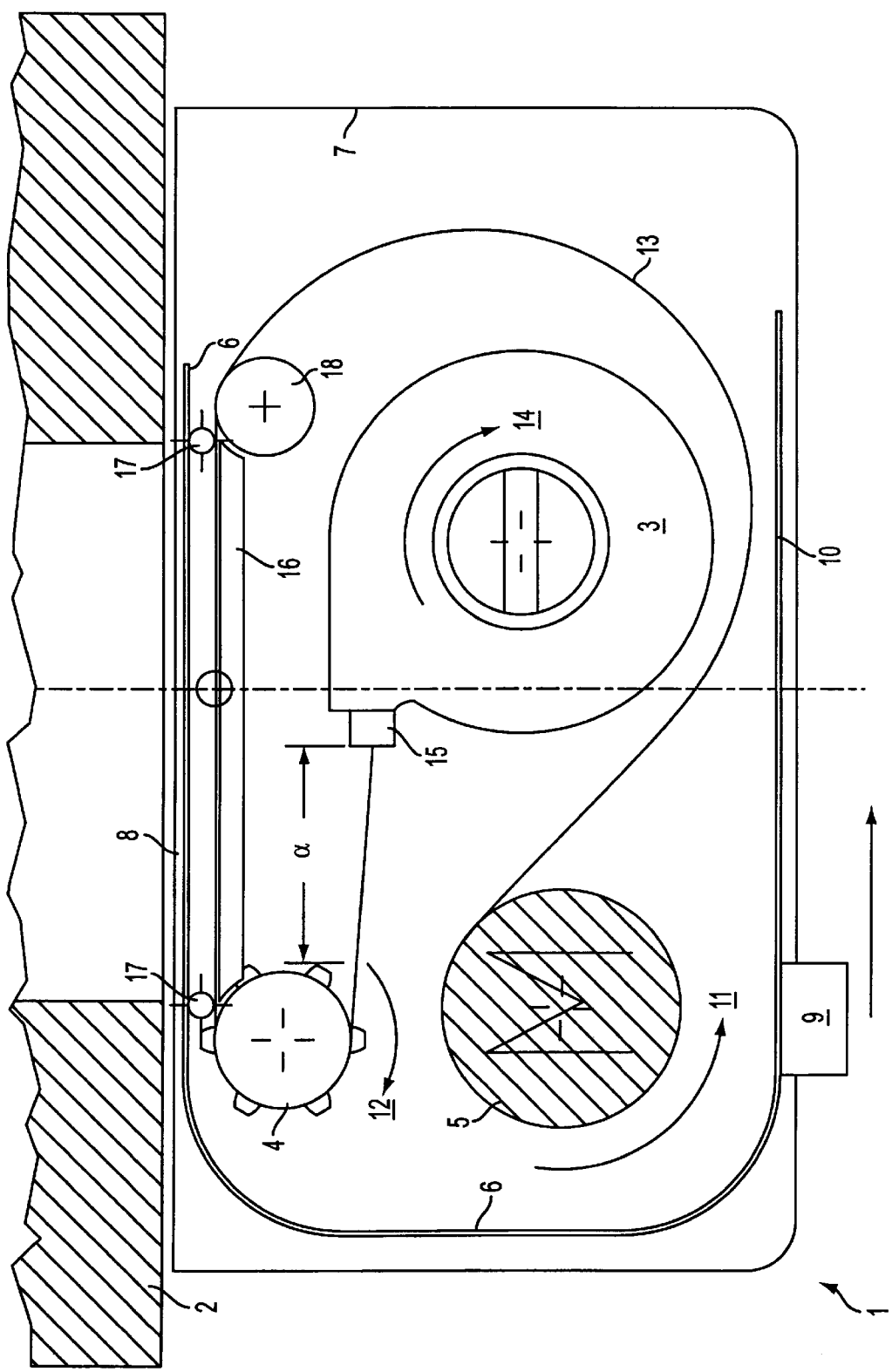
FIG. 1 shows an interchangeable miniature-film magazine according to a preferred embodiment of the present invention.

The present invention relates to a compact interchangeable miniature-film magazine for use in a camera. The compact interchangeable miniature-film magazine according to the present invention allows for automatic film threading, flatness requirements which are generally customary for the film, and a compact design, all being achieved at the same time. In a preferred embodiment, the interchangeable miniature-film magazine has a receiver for a film cassette, a sprocket for the film advancement, a winding drum, and a shutter for closing the film gate provided in the magazine housing.

These objects can be achieved according to the present invention as follows. The interchangeable miniature-film magazine can be fitted onto a conventional camera body. A magazine housing includes a receiver for a film cassette, a sprocket for the film advancement, a winding drum, and a shutter for closing a film gate. The sprocket can be located immediately behind a film-cassette outlet, at a clear distance which is smaller ta the width of the film gate. In the pre-wind operation, the film is wound completely onto the winding drum, the winding direction of the film on the winding drum being substantially identical to that of the spool body of the film cassette. The film is guided along a film path from the winding drum, that is arranged closely alongside the film cassette, in a large radius around the film cassette into the plane of the film gate, with a subsequent, nearly 180°-deflection around the sprocket into the cassette outlet.

In this case, it is possible for the sprocket to be located immediately behind a pressure plate—as seen in the winding direction of the film—the plane of which is located approximately tangentially with respect to the sprocket.

Furthermore, it is preferable to provide a guide roller immediately in front of the film gate, as seen in the winding direction of the film. The interchangeable miniature-film magazine can further include a pressure roller. This preferred arrangement ensures that the film runs into the image plane without buckling, with the film being supported on a pressure plate in the image plane.

In a preferred embodiment, the sprocket pushes the film first of all through a change in direction about 180° over its own diameter and through the film gate, whereupon the film is guided in a large arc around the film cassette and is then intercepted by the winding drum with the aid of a conventional film interception mechanism. in this embodiment, the winding drum can be driven at a higher circumferential speed than the sprocket, The sprocket can also include a freewheel. For the individual exposures, the film, which is wound completely onto the winding drum in the pre-wind operation, is then advanced from the winding drum, via the large radius, around the film cassette and into the film gate without buckling. This arrangement precludes any irregularities in the film which could have an adverse effect on the flatness. For this operation of transporting the film back into the film cassette, it is the film spool which is driven.

FIG. 1 schematically shows one exemplary preferred embodiment of the present invention. FIG. 1 shows a horizontal section through an interchangeable miniature-film magazine, which is provided overall with the designation 1. The interchangeable miniature-film magazine 1, which is fitted onto a conventional camera body 2 (a portion of which is shown), includes a receiver for a film cassette 3, a sprocket 4 for the film advancement, a winding drum 5 and a shutter 6 for closing the film gate 8 provided in the magazine housing 7.

The shutter 6 can comprise a shutter plate. Preferably shutter 6 comprises a flexurally elastic shutter plate which, by manual actuation of a shutter grip 9 connected to it, can be displaced along a shutter channel 10. Shutter channel 10 can be located near a perimeter of housing 7. FIG. 1 shows the shutter 6 in its closed position, in which the interchangeable miniature-film magazine 1 can be removed from the camera body 2 and handled separately.

In order to carry out the pre-wind operation, the winding drum 5 is provided with a motor or its own drive, actuation of the latter causing the unexposed film to be drawn out of the film cassette 3 and wound up onto the winding drum 5 in the pre-wind direction. symbolized by an arrow 11. The pre-wind direction of the sprocket 4 is indicated by the arrow 12. In this case, the winding-drum 5 for the pre-wind operation is designed with a larger circumference than sprocket 4, such that it gives the winding drum 5 a higher circumferential speed than the sprocket 4. In this example, the sprocket 4 is further provided with a freewheel. For transporting the film 13 back into the film cassette 3, in this example it is merely the film cassette 3 which is driven, to be precise in the winding direction symbolized by the arrow 14. The film cassette can be driven manually or by a conventional motor, as would be apparent to one of skill in the art given the present description, The unexposed film 13, previously, in the pre-wind operation, wound completely onto the winding drum 5, is guided in a continuous manner from the winding drum 5, arranged closely alongside the film cassette 3, along a film path in a large radius around the film cassette 3 into the plane of the film gate 8, with a subsequent, nearly 180°-deflection (or change in path) around the sprocket 4 into the cassette outlet 15 of the film cassette 3.

In this preferred embodiment, the film 13, in the region of the film gate 8, has a pressure plate 16 acting on its rear and on its side directed toward the camera body 2. Further, the film 13 can be subjected to the action of a first pressure roller 17 arranged at the beginning and a second pressure roller 17 arranged at the end of the film gate 8. Also, according to this preferred embodiment, a guide roller 18 can be provided immediately in front of the pressure plate 16 to help ensure that the film runs into the image plane without buckling.

It can be seen from the preferred embodiment of FIG. 1 that the sprocket 4 is located immediately behind the cassette outlet 15, in order to optimize the overall compact design. Sprocket 4 is located at a clear distance "a" which is smaller than the width of (across) the film gate 8. It can also be seen from FIG. 1 that the sprocket 4 is preferably located immediately behind the pressure plate 16, the plane of which is located approximately tangentially with respect to the sprocket 4.

According to an alternative embodiment of the present invention, a conventional film-intercepting device or mechanism (not illustrated specifically in the Figure) can be provided in front of the winding drum 5. Alternative implementations of the film intercepting device will be apparent to those of skill in the alt given the present description.

Figure 2:
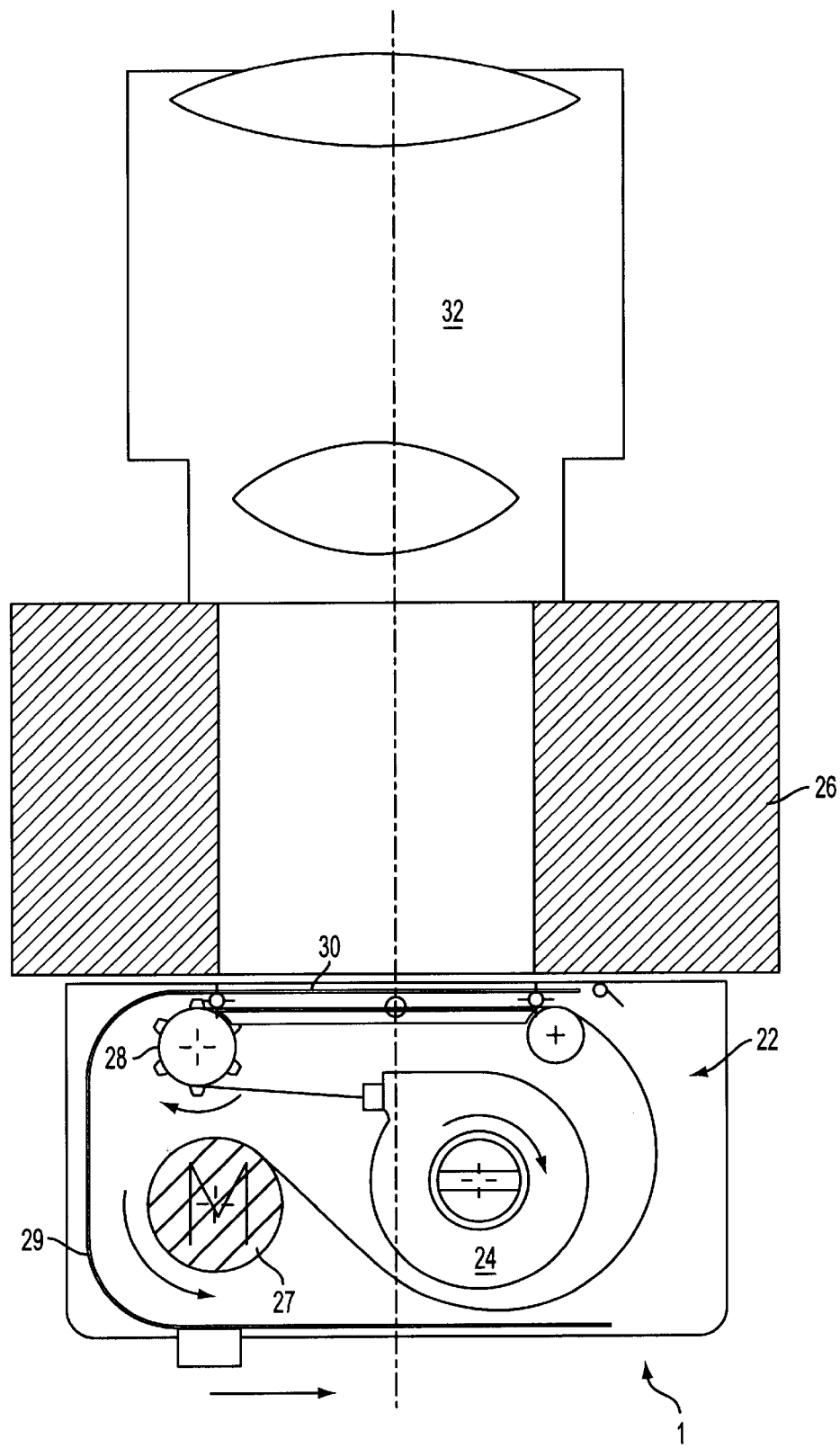
FIG. 2 shows an embodiment according to the present invention in which the interchangeable miniature-film magazine is attached to a camera body.

As shown in the embodiment of FIG. 2 an interchangeable miniature-film magazine 1 can be replaceably attached to the back wall of a camera body 26. This interchangeable miniature-film magazine can include a receiving device 22 for a film cartridge 24, a sprocket forming film-advancing device 28, a winding drum 27, and a slide or shutter 29 for closing the film window 30 provided in the housing. An objective 32, such as a conventional camera lens or telephoto lens, can be attached to the front portion of camera body 26.

Although the invention has been described above by reference to certain embodiments of the invention, the invention is nor limited the embodiments described above. Modifications and variations of the embodiments described above will occur to those skilled in the art, in light of the above teachings. The scope of the invention is defined with reference to the following claims.

German patent application no. 197 58 326.1, filed Dec. 31, 1997, including the specification, the drawings, the claims, and the abstract, upon which this application is based, is incorporated herein by reference in its entirety.

What is claimed is:

1. An interchangeable miniature-film magazine, comprising:

a magazine housing having a film gate disposed along a first wall of said magazine housing;

a film cassette housing a film and having an outlet for said film;

a receiver for receiving said film cassette and positioned in said magazine housing wherein said outlet of said film cassette is located behind said film gate;

a winding drum arranged closely alongside said film cassette, for completely taking up unexposed film;

a shutter for closing said film gate a guide roller located in said housing and disposed proximate to a first end of said film gate to prevent a buckling of said film along an image plane, said guide roller in direct film communication with said winding drum and defining a first film path arranged closely alongside said film cassette and extending from said guide roller, around an outer circumference of said film cassette, to said winding drum; and a sprocket located in said housing and disposed proximate to and immediately behind a second end of said film gate opposite said first end, said sprocket in direct film communication with an outlet of said film cassette and defining a second film path about 180 degrees around an outer diameter of said sprocket from said outlet to said second end of said film gate.

2. The miniature-film magazine of claim 1, wherein the winding-drum has a circumference that provides for a pre-wind operation at a circumferential speed on said winding drum greater than that of said sprocket.

3. The miniature-film magazine of claim 4, wherein said sprocket includes a freewheel.

4. The miniature-film magazine of claim 1, further comprising:

a pressure plate to sup port said film in said image plane.

5. The miniature-film magazine of claim 6, further comprising:

a first pressure roller located between said guide roller and said film gate.

6. The miniature-film magazine of claim 4, wherein said sprocket is located immediately behind said pressure plate, a plane of which is located tangentially with respect to said sprocket.

7. The miniature-film magazine of claim 1, wherein said outlet is disposed in said magazine housing between said guide roller and said sprocket.

8. The miniature-film magazine of claim 1, further comprising:

a shutter channel, a first portion of which is disposed near a perimeter of said housing, wherein said shutter comprises a shutter plate that can be displaced along said shutter channel.

9. The miniature-film magazine of claim 8, further comprising:

a shutter grip located along a second portion of said shutter channel, wherein said shutter plate comprises a flexurally elastic shutter plate and is displaced along said shutter channel by manual actuation of said shutter grip.

10. The miniature-film magazine of claim 1, wherein said outlet is disposed in said magazine housing and defines a first distance extending from said outlet to said sprocket that is shorter than a second distance of said film gate extending from said first end to said second end.

11. The miniature-film magazine of claim 1, wherein the second film path encircles about at least one half said outer circumference of said film cassette.

12. The miniature-film magazine of claim 1, wherein said magazine housing has a first region and a second region separated by an axis bisecting said film gate and said magazine housing, wherein said guide roller, said first end of said film gate, and a center of said film cassette are located in said first region, and wherein said sprocket, said second end of said film gate, and said winding drum are located in said second region.

13. The miniature-film magazine of claim 12, wherein said outlet is located behind said film gate proximate to said bisecting axis.

14. The miniature-film magazine of claim 1, further comprising:
   winding means coupled to said winding drum for winding said unexposed film completely onto said winding drum in a pre-wind operation.

15. The miniature-film magazine of claim 1, wherein unexposed film is located in said winding drum.

16. The miniature-film magazine of claim 1, further comprising:
   a first pressure roller located in said housing proximate to said first end of said film gate; and
   a second pressure roller located in said housing proximate to said second end of said film gate.

17. A camera, comprising a camera body;
   an objective coupled to a front portion of the camera body; and
   an interchangeable miniature film magazine replaceably attached to a back portion of the camera body, the interchangeable miniature film magazine including a magazine housing having a film gate disposed along a first wall of said magazine housing,
   a film cassette housing a film and having an outlet for said film, a receiver for receiving and positioned in said magazine housing, wherein said outlet of said film cassette is located behind said film gate,
   a winding drum arranged closely alongside said film cassette, for completely taking up unexposed film,
   a shutter for closing said film gate
   a guide roller located in said housing and disposed proximate to a first end of said film gate to prevent a buckling of said film along an image plane, said guide roller in direct film communication with said winding drum and defining a first film path arranged closely alongside said film cassette and extending from said guide roller, around an outer circumference of said film cassette, to said winding drum, and
   a sprocket located in said housing and disposed proximate to and immediately behind a second end of said film gate opposite said first end, said sprocket in direct film communication with an outlet of said film cassette and defining a second film path about 180 degrees around an outer diameter of said sprocket from said outlet to said second end of said film gate.

18. An interchangeable miniature-film magazine for replaceable attachment to a camera body and for holding a film cassette having a film outlet, comprising:
   a generally rectangular magazine housing having a film gate disposed along a first wall of said magazine housing and having a first region and a second region separated by an axis bisecting said film gate and said magazine housing, said film gate having a first end disposed in said first region and a second end disposed in said second region;
   a receiver disposed in said first region to receive the film cassette and to position the outlet of said film cassette behind said film gate and proximate to said bisecting axis;
   a winding drum disposed completely in said second region to take up unexposed film;
   a shutter channel, disposed along a perimeter region of said magazine housing;
   a shutter plate displaceable along said shutter channel;
   a sprocket located in said second region and disposed proximate to and immediately behind said second end of said film gate for receiving film from the outlet of the film cassette and changing the direction of the film about 180 degrees as the film passes across the film gate; and
   a guide roller located in said first region and positioned proximate to said first end of said film gate for guiding the film as it crosses the film gate and further guiding the film around the outer circumference of the film cassette between the winding drum and the film gate.

19. The interchangeable miniature-film magazine of claim 18, further comprising:
   a first pressure roller located proximate to said first end of said film gate;
   a second pressure roller located to said second end of said film gate; and
   a pressure plate disposed in a region of said magazine housing defined by said film gate and between said first pressure roller and said second pressure roller.

20. The interchangeable miniature-film magazine of claim 18, further comprising:
   winding means coupled to said winding drum for winding unexposed film completely onto said winding drum in a pre-wind operation.

21. The interchangeable miniature-film magazine of claim 18, wherein the winding drum has a greater circumference than the sprocket.

22. The interchangeable miniature-film magazine of claim 18, further comprising:
   unexposed photographic film, wherein a first portion of said unexposed photographic film extends from said winding drum from said first region to said second region, across said bisecting axis, around at least one half of an outer perimeter of a casing of a received film cassette to said guide roller.

23. The interchangeable miniature-film magazine of claim 22. further comprising:
   exposed photographic film, wherein a first portion of said exposed photographic film extends from said second end of said film gate about 180 degrees around an outer diameter of said sprocket into said outlet.

24. The interchangeable miniature-film magazine of claim 18, wherein said winding drum is located in said second region at a position proximate to a corner of said magazine housing furthest from said second end of said film gate.

25. The interchangeable miniature-film magazine of claim 18, further comprising:
   a shutter grip disposed on a second wall of said magazine housing and coupled to said shutter plate.

26. The interchangeable miniature-film magazine of claim 18, wherein said receiver positions the outlet of the film cassette behind said film gate and proximate to said bisecting axis.

* * * * *